United States Patent
Nichols et al.

(10) Patent No.: US 10,891,602 B2
(45) Date of Patent: Jan. 12, 2021

(54) MERCHANT POINT OF SALE SECURITY SYSTEM

(71) Applicant: PayPal, Inc., San Jose, CA (US)

(72) Inventors: Timothy C. Nichols, Los Altos, CA (US); Ramaneek Khanna, Saratoga, CA (US); Geoffrey W. Chatterton, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 741 days.

(21) Appl. No.: 15/495,758

(22) Filed: Apr. 24, 2017

(65) Prior Publication Data

US 2017/0228713 A1 Aug. 10, 2017

Related U.S. Application Data

(63) Continuation of application No. 14/012,793, filed on Aug. 28, 2013, now Pat. No. 9,633,345.

(51) Int. Cl.
*G06Q 20/20* (2012.01)
*G07G 3/00* (2006.01)
*G06Q 20/40* (2012.01)

(52) U.S. Cl.
CPC ......... *G06Q 20/20* (2013.01); *G06Q 20/4016* (2013.01); *G07G 3/00* (2013.01)

(58) Field of Classification Search
CPC combination set(s) only.
See application file for complete search history.

(56) References Cited

U.S. PATENT DOCUMENTS

| | | |
|---|---|---|
| 5,918,211 A | 6/1999 | Sloane |
| 8,429,016 B2 | 4/2013 | Bobbitt et al. |
| 2003/0098910 A1 | 5/2003 | Kim |
| 2006/0243798 A1* | 11/2006 | Kundu ............... G06K 9/00718 235/383 |
| 2008/0007404 A1 | 1/2008 | Albert et al. |
| 2011/0022480 A1 | 1/2011 | Hoblit et al. |
| 2011/0261203 A1* | 10/2011 | Mupkala ................ G07G 3/006 348/150 |
| 2013/0182107 A1 | 7/2013 | Anderson |
| 2013/0347084 A1* | 12/2013 | Malinowski ............ G06F 21/74 726/6 |
| 2014/0160293 A1 | 6/2014 | Ristivojevic et al. |
| 2015/0066671 A1* | 3/2015 | Nichols .................. G06Q 20/20 705/18 |
| 2017/0316537 A1* | 11/2017 | Drzymala .............. G06Q 90/20 |

* cited by examiner

*Primary Examiner* — Scott A Zare
(74) *Attorney, Agent, or Firm* — Haynes and Boone, LLP

(57) ABSTRACT

A point of sale (POS) security system includes a POS device including a non-transitory memory, one or more hardware processors, and one or more environment sensors. A plurality of POS instructions are located on the non-transitory memory in the POS device and executable by the one or more hardware processors in the POS device to provide a POS engine that is configured to receive and transmit payment information for conducting a payment transaction associated with a purchase. A plurality of security instructions are located on the non-transitory memory in the POS device and are executable by the one or more hardware processors in the POS device to provide a security engine that is configured to receive environment signals from the one or more environment sensors in the POS device and analyze those environment signals to determine a security breach.

20 Claims, 11 Drawing Sheets

MERCHANT POINT OF SALE SECURITY SYSTEM

CROSS REFERENCED TO RELATED APPLICATIONS

This application is a continuation of U.S. application Ser. No. 14/012,793, filed on Aug. 28, 2013, and issued as U.S. Pat. No. 9,633,345 on Apr. 25, 2017, the contents of which are incorporated by reference in its entirety.

BACKGROUND

Field of the Invention

The present invention generally relates to merchant payment systems and more particularly to a merchant point of sale payment system that may be purposed as a security system.

Related Art

Merchants typically have physical locations such as, for example, "brick and mortar" stores, where the merchant sells products and/or services. Those merchant physical locations typically include point of sale (POS) systems having one or more POS devices for receiving payments from customers for products and/or services, and may include merchant-assisted checkout computers, customer self-checkout computers, tablet checkout computers, mobile checkout computers, mobile wearable customer engagement computers, and/or a variety of other POS devices known in the art. Such POS systems can be relatively expensive but are necessary to enable the merchant to receive payments from customers for their products and/or services. Many merchant physical locations also include security systems to protect the merchant physical location from theft. Those security systems can include cameras and motion sensors for detecting unauthorized access to the merchant physical location, and in some cases contact the police in response to a detected breach of security. Such security systems are also relatively expensive and may require professional setup and maintenance.

As discussed in further detail below, there is a need for an improved security system that may be realized by repurposing a merchant POS system when, for example, that POS system is not in use, which results in the reduction of costs for the merchant by negating the need to purchase and implement a separate security system.

Figure 1:
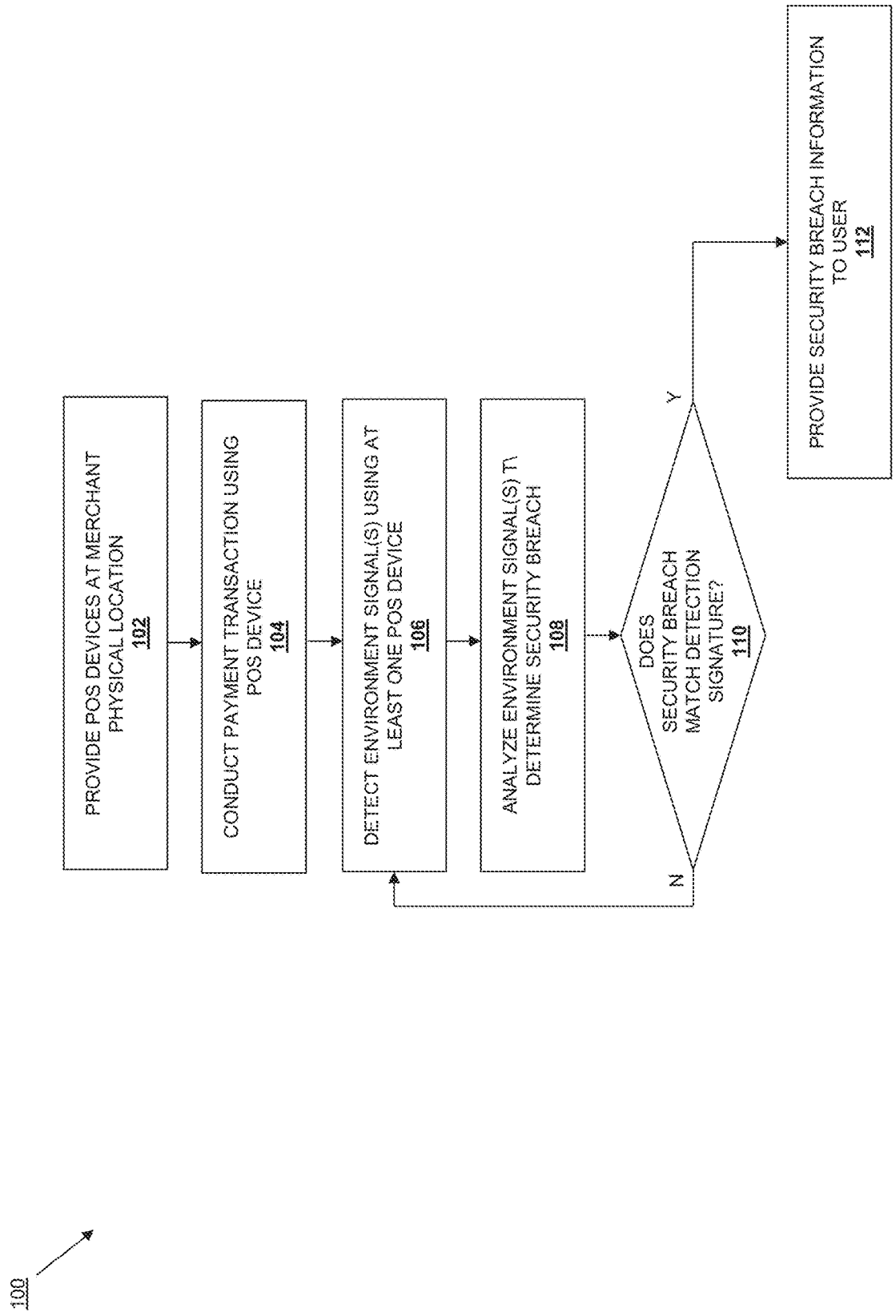
FIG. 1 is a flow chart illustrating an embodiment of a method for providing a security system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for providing a security system. In one embodiment, the security system is provided at a merchant physical location using a plurality of point of sale (POS) devices and other computing devices of the merchant that are located in the merchant physical location and that are used to help customers. For example, POS devices and other computing devices such as tablet computers, wearable mobile customer engagement devices, desktop computers, mobile payment accepting devices, televisions, and dedicated customer checkout devices may be provided at the merchant physical location, and during operating hours at the merchant physical location, those devices may be used for conducting payment transactions, providing information to customers, providing information about customers for assisting those customers, and/or providing a variety of other POS and other functionality known in the art. However, because each of those POS devices may also include environment sensors such as cameras, microphones, accelerometers, network communication devices, and/or a variety of other environment sensors known in the art, the devices may be repurposed to provide a security system at the merchant physical location by monitoring the environment sensors for environment signals and analyzing those environment signals to determine whether a security breach has occurred after business/operating hours at the merchant physical locations.

While the embodiment illustrated and discussed below is directed to the POS device security system located at a merchant physical location, the teachings of the present disclosure may be applied to a wide variety of different physical locations in which a plurality of computing devices with environment sensors are used for a primary purpose but may be repurposed to provide the security system discussed below when not in use. For example, a family home may include a variety of computing devices such as mobile phones, laptop computers, tablet computers, desktop computers, televisions, etc., each of which may include one or more environment sensors that may allow those computing devices to be repurposed to provide a security system similar to the POS security system discussed below. Similarly, offices, restaurants, warehouses, and/or other physical locations known in the art may include similar computing devices that may be repurposed according to the teachings discussed herein to recognize the benefits of a security system that reduces costs for its users because it is part of an existing computing system rather than a dedicated security system.

Figure 2:
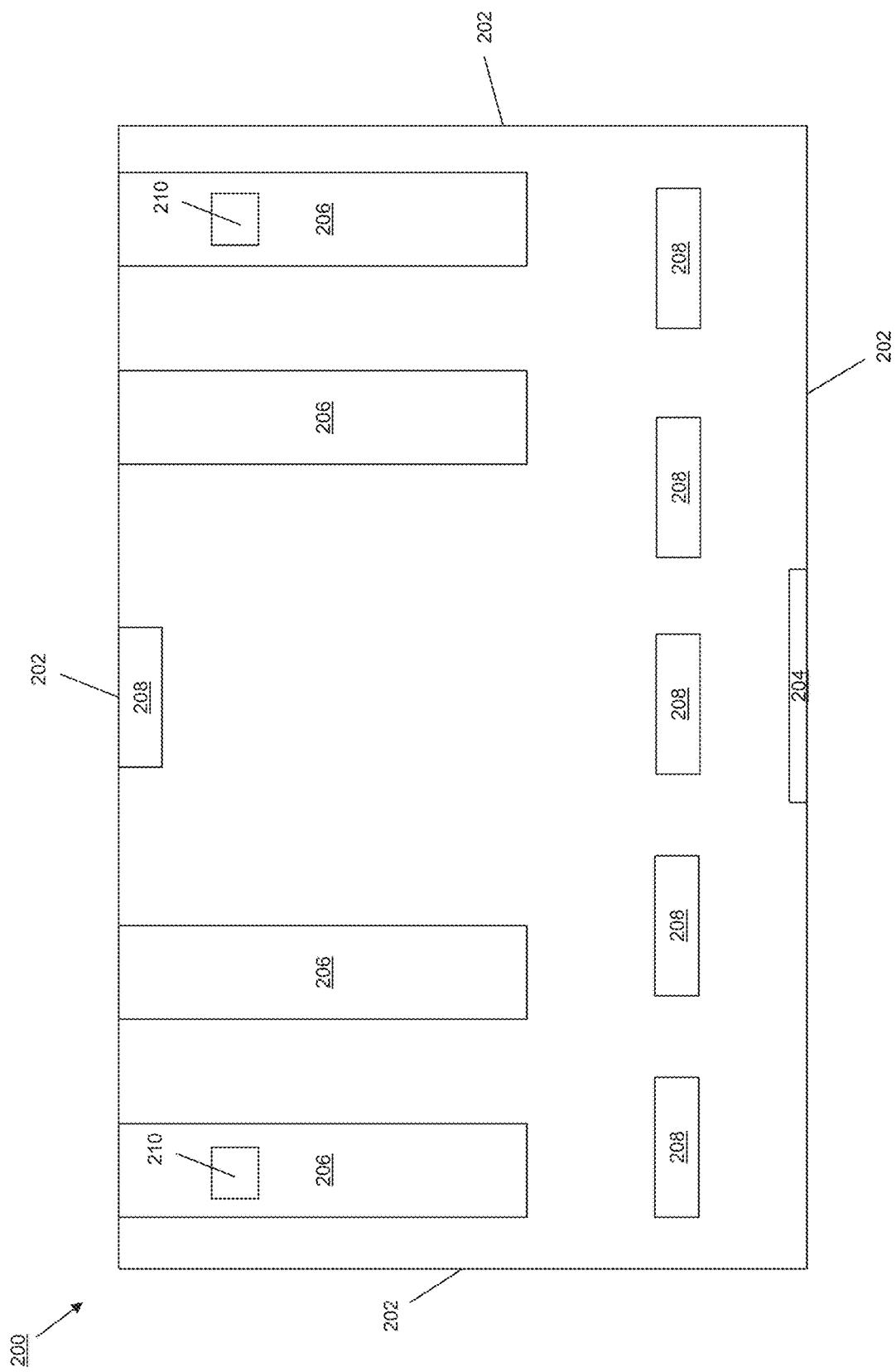
FIG. 2 is a is a schematic view illustrating an embodiment of a merchant physical location.

Referring now to FIGS. 1 and 2, an embodiment of a method 100 for providing a POS security system is illustrated. The method 100 begins at block 102 where POS devices are provided at a merchant physical location. FIG. 2 illustrates an embodiment of a merchant physical location 200 that may be, for example, a grocery store, a clothing store, and/or a variety of other merchant physical locations known in the art that includes a plurality of checkout POS devices and other computing devices. However, as discussed further herein, a variety of other physical locations that includes a variety of computing devices will fall within the scope of the present disclosure. The merchant physical location 200 includes a plurality of walls 202 that define the merchant physical location 200 between them, and an entrance 204 such as, for example, a door that provides access to the merchant physical location 200. A plurality of product sections 206 such as, for example, shelves, racks, and/or a variety of other product display areas known in the art are located in the merchant physical location 200 and include one or more products provided for purchase by customers. A plurality of POS devices 208 are positioned around the merchant physical location 200 and, in the illustrated embodiments, include a plurality of POS devices 208 positioned near the entrance 204 of the merchant physical location 200, as well as a POS positioned at the rear of the merchant physical location 200. A plurality of peripheral devices 210 are located in product sections 206 and are in communication with at least one of the POS devices such as, in the embodiments discussed below, the POS device 208 in the rear of the merchant physical location 200.

In some of the embodiments illustrated and described below, any or all of the POS devices 208 are relatively immobile checkout devices at which a customer may conduct a payment transaction in the merchant physical location 200 to purchase products sold by a merchant. For example, the POS devices 208 may be operated by the merchant or representatives/employees of the merchant, or may be self-checkout devices that may be operated by the customers. In some embodiments, the POS devices may include mobile devices for conducting payment transactions such as, for example, a tablet computer running a payment application, a mobile payment card processing device (e.g., a mobile credit card reader), a mobile phone, a laptop computer, and/or a variety of other mobile devices known in the art. For example, each of the mobile POS devices 208 may include docking stations for charging the mobile device so that their POS functionality may be utilized anywhere in the merchant physical location 200, and when that functionality is not being used those mobile POS devices may be docked. As such, the positioning of the docking stations in the merchant physical location 200 may be selected to optimize the security functionality as discussed below.

In some embodiments, other computing devices may be included in the merchant physical location 200. For example, wearable mobile customer engagement devices such as, for example, Google Glass® available from Google Inc. of Mountain View, Calif., may be used in the merchant physical location 200 to allow a merchant to help customer (and in some cases, act as POS device in conducting payment transactions with customers), and may be utilized in the POS security system described herein. In another example, tablet computers or televisions that are not POS devices but that provide information to customers (e.g., at an information kiosk in the merchant physical location 200) during merchant business/operating hours may be positioned around the merchant physical location and used in the POS security system described herein outside of merchant business/operating hours. While a few examples of POS devices and other computing devices that may be located around the merchant physical location 200 have been provided, one of skill in the art in possession of the present disclosure will recognize that a wide variety of computing devices known in the art may be used in the security system discussed below without departing from the scope of the present disclosure.

Each of the POS devices (and other computing devices discussed above that may be utilized in the POS security system) includes at least one environment sensor, and in many cases, include a plurality of environment sensors. Examples of environment sensors that may be included in the POS devices and other computer devices include cameras, microphones, accelerometers, infrared sensors, temperature sensors, smoke sensors, motion sensors, and/or a variety of environment sensors known in the art. Furthermore, a plurality of POS devices and/or other computing devices may operate together to provide environment sensors. For example, wireless networking devices on the plurality of POS devices and/or other computing devices may operate to detect changes in wireless signal quality for the POS devices and/or other computing devices, and those wireless signal quality measurements in different locations in the merchant physical location over time may be analyzed to detect motion, discussed in further detail below. In another example, speaker systems and microphone systems on the plurality of POS devices and/or other computing devices may operate to detect motion by emitting a sound from a speaker on a first device and measuring that sound a received by the microphones on a plurality of second devices, and those sound measurements in different locations in the merchant physical location over time may be analyzed to detect motion, discussed in further detail below.

While a few examples of environment sensors have been provided, one of skill in the art in possession of the present disclosure will recognize that a wide variety of environment sensors known in the art may be provided in the POS device and/or other computing devices without departing from the scope of the present disclosure. Furthermore, one of skill in the art will recognize that many POS devices and other computing devices (e.g., tablet computers, mobile phones, etc.) may include the environment sensors discussed above already built into the device, and as such the POS devices and/or other computing devices are not specialized security devices, but rather are devices with a primary, non-security purpose that may be repurposed due to their inclusion of environment sensors to perform the security functions discussed below.

As discussed above, the peripheral devices 210 in the illustrated embodiment are in communication with the POS device 208 at the rear of the merchant physical location 200, but other embodiments may include other peripheral devices in communication with any of the POS devices 208 near the entrance 204 of the merchant physical location 200. In a specific example, the communication connection between the POS device 208 and the peripheral devices 210 is a wireless connection (e.g., a Wifi connection, a Bluetooth connection, a Bluetooth low energy (BLE) connection, and/or a variety of other wireless connections known in the art) that allows the peripheral devices 210 to be positioned anywhere in merchant physical location 200 or outside the merchant physical location 200 but within the limits of the wireless communication connection. However, in other embodiments, POS devices 208 may be connected to peripheral devices 210 through wired connections (e.g., a universal serial bus (USB) connection or other wired connection known in the art). As discussed below, the peripheral devices 210 may be used to extend the functionality, range, and/or detection capabilities of the POS security system when the POS devices 208 and/or other computing devices available in the merchant physical location 200 do not provide the desired security coverage. However, in many embodiments, the POS devices 208 will provide sufficient security coverage in the merchant physical location 200 such that the peripheral devices 210 may be omitted.

The peripheral devices 210 may include a variety of devices known in the art having one or more environment sensors similar to those discussed above with reference to the POS devices 208 and/or the other computing devices. For example, the peripheral devices 210 may be or have cameras, microphones, accelerometers, infrared sensors, heat sensors, speakers, smoke detectors, wireless access points, water or other moisture detectors, and/or a variety of other environment sensors known in the art. In some embodiments, the peripheral devices 210 may be dedicated environment sensors that include, for example, a smoke detector. In other embodiments, the peripheral devices 210 may be devices such as cameras that have been repurposed for the security system and include multiple environment sensors such as a camera and a microphone. As such, a merchant may expand the functionality of the security system beyond that available with just the environment sensors included in the POS devices 208 by communicatively connecting peripheral devices 210 with desired sensing capabilities and appropriately positioning those peripheral devices 210 in or around the merchant physical location 200. For example, a merchant at the merchant physical location 200 may connect a heat sensing and/or smoke detecting peripheral device 210 to a POS device 208 for fire detection capability, a water or moisture detecting peripheral device 210 to a POS device 208 for flood detecting capability, etc. (as those environment sensors may not be included in a conventional tablet computer, mobile phone, or other computing or POS device).

In some embodiments, one of the POS devices 208 may be a management POS device that communicates with the other POS devices to receive environment signals generated by the environment sensors from those POS devices and itself. In other embodiments, a local computing device (e.g., a desktop computer or other non-POS device located in the merchant physical location) is connected to the POS devices 208 and acts as a management device to analyze environment signals generated by the environment sensors from the POS devices 208 and their connected peripheral devices 210, if present. Either of the management POS device and/or local computing device may be operable to analyze the environment signals received from the POS devices 208 and/or its own environment sensors. Either of the management POS device and/or local computing device may be communicatively connected to a network (e.g., the Internet) to transmit environment signals (analyzed or not) over the network to a remote management device, discussed in further detail below. While a management device in the merchant physical location has been described, in some embodiments, each of POS devices 208 may be connected to a network (e.g., the Internet) to transmit environment signals (analyzed or not) over the network to a remote management device, rather than through a local management device in the merchant physical location 200.

An embodiment of a merchant physical location 200 has been described that includes a plurality of POS devices having environment sensors positioned about the merchant physical location 200. However, one of skill in the art in possession of the present disclosure will recognize that the teachings of the present disclosure may be applied in a variety of other physical locations in which computing devices having environment sensors are used for a primary, non-security purpose. For example, a business office may include a plurality of computing devices such as desktop computers, laptop computers, mobile phones, etc., and those computing devices may be repurposed according to the teachings of the present disclosure to provide the security system described herein. Similarly, a family home may include a plurality of computing devices such as desktop computers, laptop computers, mobile phones, televisions, etc., and those computing devices may be repurposed according to the teachings of the present disclosure to provide the security system described herein. Thus, while the specific embodiment below is directed to a merchant physical location with POS devices, a wide variety of modification to that specific embodiment is envisioned as falling within the scope of the present disclosure.

The method 100 then proceeds to block 104 where a payment transaction is conducted using a POS device. Each of the POS devices 208 includes a non-transitory memory storing instruction that, when executed by one or more hardware processors in the POS device, provides a POS engine that is configured to receive and transmit payment information for conducting a payment transaction associated with a purchase. Thus, at block 104, any or all of the POS devices 208 in the merchant physical location 200 may be used to transact a payment with a customer. For example, during merchant business/operating hours, customers may enter the merchant physical location 200, select products from the product sections 206, and pay for those products at the POS devices 208. In some embodiment, the POS devices are manned by the merchant or merchant employees (hereinafter, the "merchant"), and the payment transaction is carried out by the customer interacting with the merchant and the merchant operating the POS device 208. In other embodiments, the POS devices 208 are self-checkout devices that are operated by the customer to carry out the payment transaction. As such, customer information, product information, payment information, and/or other payment transaction information may be presented to the POS device 208, transmitted over a network to a payment service provider, financial account provider, and/or other payment transaction provider, and a payment authorization may be received over the network at the POS device authorizing the payment transaction and allowing the customer to purchase the product from the merchant.

Any of the environment sensors on the POS devices 208 may be utilized during the payment transaction at block 104. For example, a camera on a POS device 208 may be used to capture images of a customer's face (e.g., for facial recognition identification), a payment device or instrument (e.g., for reading an account number from a payment card), etc. In another example, a microphone on a POS device 208 may be used to receive customer identification, instructions to carry out the payment transaction, and/or other customer or merchant verbal commands (e.g., using voice recognition software) to facilitate the payment transaction discussed above. In another example, an infrared sensor on the POS device 208 may be used to detect counterfeit bills when the customer is paying for a purchase with cash. In another example, a wireless communication device in the POS device 208 may be used to transmit and receive information over the network. In addition, environment sensors in the POS devices 208 may not be utilized in the payment transaction at block 104. For example, many computing devices such as mobile phones or tablet computers may automatically include accelerometers or other environment sensors for other uses of those computing devices but that are not utilized in a payment transaction.

The method then proceeds to block 106 where environment signals are detected using at least one POS device. In some embodiments, block 106 of the method 100 is performed outside of merchant business/operating hours. For example, the POS devices 208 in the merchant physical location 200 may be dedicated to performing payment transaction at block 104 during merchant business/operating hours, and then may be repurposed to provide a security system outside of merchant business/operating hours by performing blocks 106-112 of the method 100 as discussed below. As such, instructions may be sent to each of the POS devices 208 and other computing devices to transition those devices from payment and customer engagement functionality to security system functionality (e.g., by a management device.) However, in other embodiment, environment sensors on the POS devices 208 may be used during merchant business/operating hours to provide a security system at the same time as that POS device 208 is used to perform payment transactions at block 104. For example, some environment signals associated with a security breach, such as a detected sound signal that matches a gun shot, may be detected while the POS devices 208 are being used to conduct payment transaction at block 104.

At block 106, any of the environment sensors in any of the POS devices 208, other computing devices, and peripheral devices 210 may be used to detect environment signals in and around the merchant physical location 200. Thus, cameras in the POS devices 208 may detect movement by, for example, analyzing images of a particular camera view that are taken at different times; microphones may detect sound; accelerometers may detect vibrations; heat sensors may detect heat; moisture/water sensors may detect moisture/water; smoke detectors may detect smoke; infrared sensors may detect movement; and/or a variety of other environment sensors known in the art may detect environment signals known in the art.

In addition, groups of POS devices, other computing devices, and peripheral devices 210 may detect environment signals by, for example, detecting movement via changes in a wireless environment, based on sounds emitted by a first POS device and detected by other POS device, etc. For example, a plurality of POS device 208, other computing devices, and/or peripheral devices 210 may together operate (e.g., by sending data to a management device) to analyze the signal quality at different times in a wireless environment of the merchant physical location (e.g., a Wifi wireless environment, a Bluetooth wireless environment, a BLE environment, etc.) to detect motion. In another example, a first POS device, other computing device, and/or peripheral device 210 may emit an ultrasonic sound from a speaker that may be detected at different times by one or more other POS devices 208, computing devices, and/or peripheral devices 210, and that detection data may be analyzed by a management device to detect objects and thus movement (e.g., from the changing location of objects).

While a few examples of the detection of environment signals at block 106 have been provided, one of skill in the art in possession of the present disclosure will recognize that any variety of environment signals known in the art may be detected at block 106 using the appropriate environment sensors (either provided on the POS devices 208, the other computing devices, and/or using specialized peripheral devices 210) that will fall within the scope of the present disclosure.

Figure 3A:
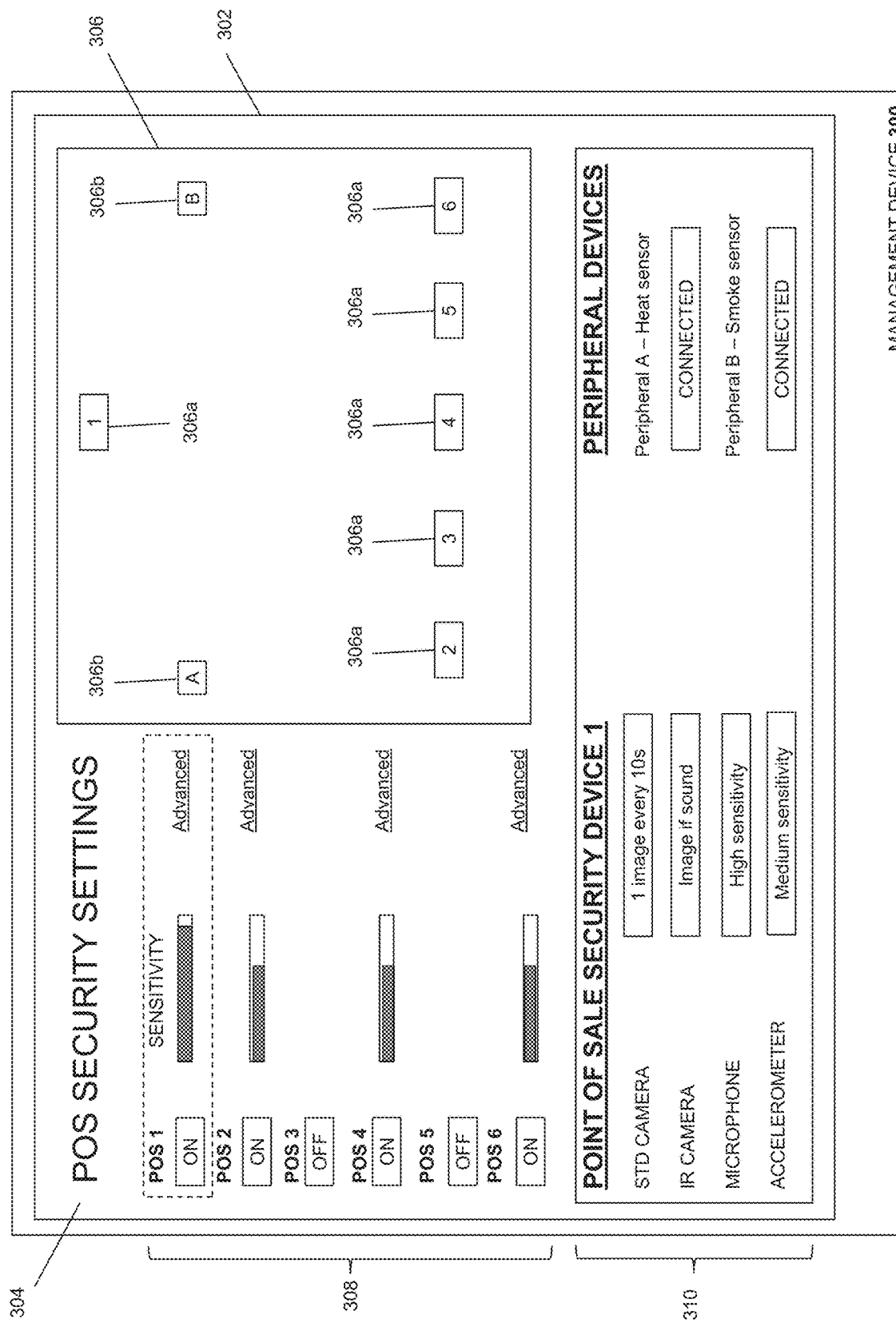
FIG. 3a is a screen shot illustrating an embodiment of a POS security setting screen provided on a merchant device.

Referring now to FIGS. 1 and 3a, the method 100 then proceeds to block 108 where the environment signals are analyzed for a security breach. Referring first to FIG. 3a, an embodiment of a management device 300 is illustrated that includes a display 302 displaying a POS security setting screen 304. In an embodiment, the management device 300 may be a management POS device located in the merchant physical location 200, a local management device located in the merchant physical location 200, or a remote management device connected to the devices at the merchant physical location 200 through a network. Thus, the management device 300 may be connected to each of the POS devices 208, other computing devices, and/or peripheral devices 210 in the merchant physical location 200 either through a local network (e.g., a Wifi network, a Bluetooth network, a local area network (LAN), etc.) or a remote network (e.g., the Internet), to receive and provide the information on the POS security screen 304 and other screens like it. Prior to block 108 of the method 100, the management device 300, POS security setting screen 304, and other setting screens like it may be used to provide security settings that define one or more environment signals that will result in a determination of a security breach at block 108.

In the illustrated embodiment, the POS security setting screen 304 includes a merchant physical location graphic 306 that includes a plurality of POS device indicators 306a and peripheral device indicators 306b. In the illustrated embodiment, each of the POS device indicators 306a and the peripheral device indicators 306b are positioned on the merchant physical location graphic 304 relative to each other in a manner that is similar to their relative positioning in the merchant physical location 200. In one example, the POS devices 208 and peripheral devices 210 include location determination devices (e.g., Global Positioning System (GPS) devices) that allow the locations of those devices to be determined and the relative locations of the POS device indicators 306a and the peripheral device indicators 306b on the merchant physical location graphic 304 to be provided automatically by the management device 300. In another example, the user of the management device 300 may place the POS device indicators 306a and the peripheral device indicators 306b on the merchant physical location graphic 304 such that the relative positions of the POS devices 208 and peripheral devices 210 in the merchant physical location 200 are property indicated.

The POS security setting screen 304 also includes a POS devices setting section 308 that includes basic information and controls for each of the POS devices 208 in the merchant physical location 200 including, for each POS device the illustrated embodiment, an on/off button that allows that POS device to be activated or deactivated for the security system, a sensitivity that allows the detection sensitivity for that POS device to be adjusted, and an advanced settings link that provides access to more advanced settings for that POS device. In the illustrated embodiment, some of the POS devices have been deactivated due to, for example, their redundancy in the security system (e.g., because they are close to another POS device with the same environment sensors and are thus not needed), while the sensitivity of the POS device in the rear of the merchant physical location has been increased (e.g., because it is further away from possible break-in points of the merchant physical location 200 such as the entrance and/or windows).

The POS security setting screen 304 also includes a POS device section 310 that may be provided, for example, in response to a user of the management device 300 selecting the advanced settings link for a particular POS device in the POS devices setting section 308. In the illustrated embodiment, the user has selected the advanced settings link for the POS device 208 in the rear of the merchant physical location 200, and the POS device section 310 is displaying a plurality of environment sensors included on that POS device (e.g., a standard camera, an IR camera, a microphone, and an accelerometer in the illustrated embodiment), details associated with those environment sensors (e.g., a setting for the standard camera to capture 1 image every 10 second, a setting for the infrared camera to capture an image if sound is detected, a setting for the microphone of high sensitivity, and a setting for the accelerometer of medium sensitivity in the illustrated embodiment). The POS device section 310 of the illustrated embodiment also includes a section detailing the peripheral devices connected to the POS device 208 in the rear of the merchant physical location 200, and includes indications of the type of environment sensor provided on each connected peripheral device, as well as the connection status of each of those peripheral devices.

While a simplified example of a POS settings screen has been provided for clarity of discussion and illustration, one of skill in the art will recognize that the setting screen or other screens like it may be provided that allow any details of the POS devices and environment sensors to be adjusted and/or programmed for the security system. In an embodiment, specific readings or ranges of environment signals may be set using settings screens that will cause a security breach to be determined. For example, particular sounds (e.g., a gun shot, breaking glass, etc.) may be provided or set that will result in determination of a security breach. In another example, particular decibel levels may be set that will result in a determination of a security breach. In another example, particular movement or vibration levels may be set that will result in the determination of a security breach. Other features included on the POS setting screen may include a security system activation time that the user may set based on, for example, when merchant business/operating hours end, such that the security system is activated regularly when it is known that the POS functionality of the POS devices 208 will not be in use.

Furthermore, detection signatures may be provided using POS security setting screens that will cause a detected security breach to be ignored. In an embodiment, the POS security settings screen may allow the user of the management device 300 to define detection signatures that include one or more environment signals that, when detected, will result in the determination of no security breach when a security breach would otherwise be determined. For example, the user may define a detection signature that includes images of the merchant or merchant employees, and one or more POS devices detects sound, motion, or other environment signals that indicate a person is in the merchant physical location 200 at an unauthorized time, one or more cameras on the POS or other computing devices may capture an image, if that image includes the images of the merchant or merchant employees, such a detection will result in a determination of no security breach. In such an example, the POS devices or management device may include facial recognition functionality or object recognition functionality (e.g., to recognize objects such as family pets) such that a captured image may be compared to the detection signature to determine whether the captured image includes an image provided in the detection signature. In another example, a detection signature may include an object minimum size that will result in a determination of a security breach, which may be useful when the physical location includes a pet or other animals that may cause the detection of movement that is not a security breach. In another example, detection signatures may include multiple environment signals such as, for example, facial recognition of a merchant or merchant employee along with a spoken word or phrase (e.g., such that a merchant or authorized merchant employee entering the merchant physical location 200 outside of business/operating hours must speak a "passcode" in order to not have a security breach determined). While a few examples of detection signatures have been provided, one of skill in the art in possession of the present disclosure will recognize that a variety of different scenarios exist where detected environment signals should not result in a determination of a security breach, and those detection signals should fall within the scope of the present disclosure.

At block 108, the environment signals detected at block 106 are analyzed to determine a security breach. In an embodiment, each POS device and/or other computing device in the merchant physical location includes a non-transitory memory that includes instruction that, when executed by one or more hardware processors in the POS device, cause the one or more hardware processors to provide a security engine that receives the environment signals from its environment sensors and that may analyze those environment signals to determine a security breach. In another embodiment, a management device (e.g., a management POS device, a local management device in the merchant physical location 200, a remote management device in the merchant physical location 200, etc.) includes a non-transitory memory that includes instruction that, when executed by one or more hardware processors in the management device, cause the one or more hardware processors to provide a security engine that receives the environment signals from the environment sensors in the POS devices 208, the other computing devices, and/or the peripheral devices 210 and that may analyze those environment signals to determine a security breach.

In one example of block 108, the environment signals analyzed at block 108 result in a determination of a security breach based on detected motion. For example, the environment signals analyzed at block 108 may include images of the merchant physical location 200 taken using cameras in one or more POS devices, other computing devices, or peripheral devices that include objects in different positions over time (i.e., due to their movement) such that a determination of a security breach based on movement is made. In another example, the environment signals analyzed at block 108 may include changing wireless signal quality in the merchant physical location 200 received from wireless communication devices in one or more POS devices, other computing devices, or peripheral devices that that may be analyzed to infer movement of an object through the merchant physical location that effects the wireless signal quality over time such that a determination of a security breach based on movement is made. In another example, the environment signals analyzed at block 108 may include sound measurements made in the merchant physical location 200 and received from microphones in one or more POS devices, other computing devices, or peripheral devices that that may be analyzed to infer movement of an object through the merchant physical location based on those sound measurements over time of an ultrasonic sound emitted by one of the POS devices such that a determination of a security breach based on movement is made.

In another example, the environment signals analyzed at block 108 may include sound recordings in the merchant physical location 200 received from microphones in one or more POS devices, other computing devices, or peripheral devices that that may be analyzed to determine a sound in the merchant physical location that results a determination of a security breach based on a type of sound (e.g., broken glass, a gunshot, etc.). In another example, the environment signals analyzed at block 108 may include may include multiple environment signals such as heat and/or smoke measurements in the merchant physical location 200 received from heat and/or smoke sensors in one or more POS devices, other computing devices, or peripheral devices that that may be analyzed to determine a heat and/or smoke in the merchant physical location that results a determination of a security breach based on a fire. In another example, the environment signals analyzed at block 108 may include moisture and/or water measurements in the merchant physical location 200 received from moisture and/or water sensors in one or more POS devices, other computing devices, or peripheral devices that that may be analyzed to determine moisture and/or water in the merchant physical location that results a determination of a security breach based on a flood.

In any of the examples above, the analysis of the environment signals at block 108 may include comparing those environment signals to security settings in a database to determine whether the environment signal or signals exceeds a threshold that results in a determination of a security breach. As such, sound measurements or recordings over a particular decibel level (e.g., indicative of breaking glass, a kicked-in door, etc.), heat measurements over a particular temperature (e.g., indicative of a fire), vibrations over a particular frequency or amplitude, and/or a variety of other threshold measurements known in the art may result in the determination of a security breach. While a few examples of environment signals that will result in the determination of a security breach have been provided above, one of skill in the art in possession of the present disclosure will recognize that a wide variety of environment signals and analysis of those signals may fall within the scope of the present disclosure in the analysis and determination of the security breach at block 108 of the method 100.

The method 100 may then proceed to decision block 110 where it is determined whether the security breach determined at block 108 matches a detection signature. As discussed above, a user of the POS security system (e.g., a merchant) may provide one or more detection signatures that include one or more environment signals that, upon detection, will not result in the determination of a security breach. At decision block 110, the POS device(s), other computing device(s), local management device, and/or remote management device may compare the environment signals that were analyzed and resulted in the determination of a security breach at block 108, and compare those to one or more environment signals included in one or more detection signatures in a database.

If, at decision block 110, it is determined that the environment signals that resulted in the determination of a security breach match the environment signals in a detection signature, that security breach is ignored and the method 100 proceeds back to block 106 where environment signals are detected. In some embodiments, ignoring of a determined security breach may result in its associated environment signals being recorded/logged, but with no corresponding security breach information or warning sent to a user of the POS security system.

Figure 3B:
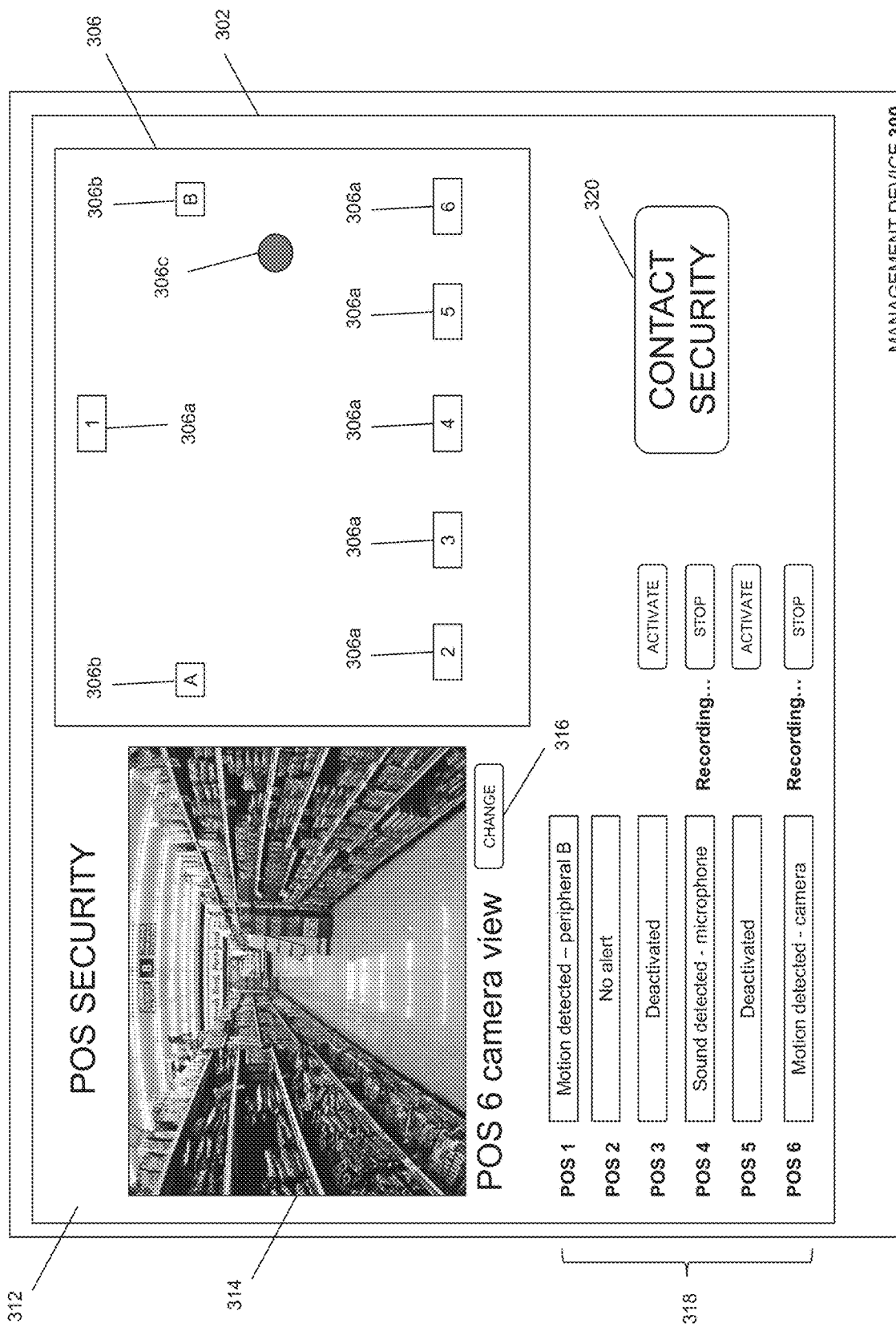
FIG. 3b is a screen shot illustrating an embodiment of a POS security viewing screen provided on a merchant device.
Figure 3C:
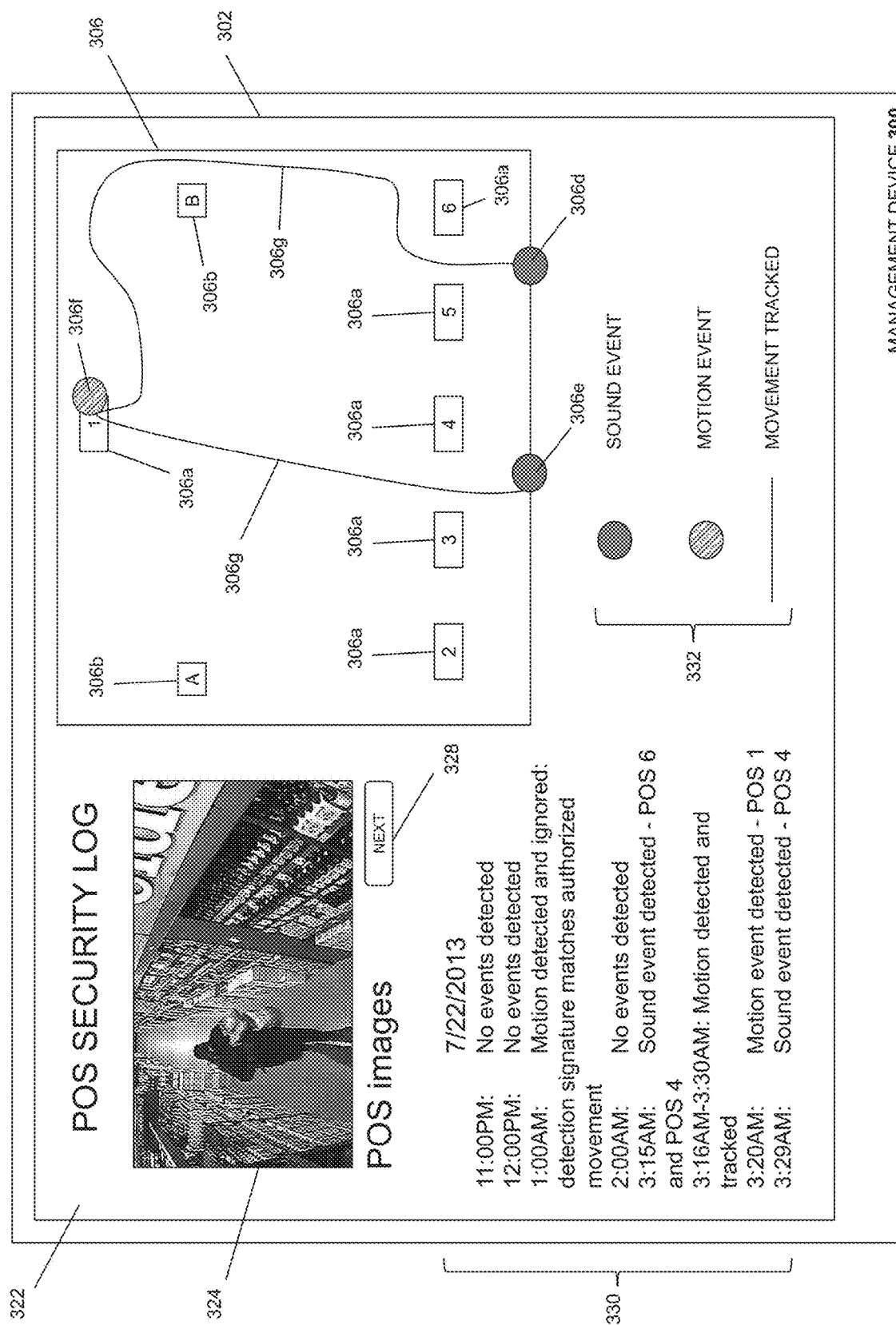
FIG. 3c is a screen shot illustrating an embodiment of a POS security review screen provided on a merchant device.

Referring now to FIGS. 1, 3b, and 3c, if at decision block 110, it is determined that the environment signals that resulted in the determination of a security breach do not match the environment signals in any detection signature, the method 100 then proceeds to block 112 where security breach information is provided to a user. In the embodiment discussed below, security breach information is provided to a remote management device 300 for display to a user. However, the security breach information may be provided to a storage system for later transfer to the user, a local management device for later display to the user, a mobile user device for immediate display to the user, and/or in a variety of other manners known in the art. Furthermore, security breach information provided to the user may include screen shots, short message service (SMS) messages, multimedia message service (MMS) messages, audio, video, and/or in any other manner known in the art for transmitting security breach information.

FIG. 3b illustrates an embodiment of the management device 300 including the display 302 displaying a POS security viewing screen 312 that includes the security breach information provided to the user at block 112. In the illustrated embodiment, the POS security viewing screen 312 includes the merchant physical location graphic 306 having the plurality of POS device indicators 306a and peripheral device indicators 306b discussed above, as well as a detection location 306c. In an embodiment, the security breach information provided at block 112 includes location information related to the environment signals detected at block 106 that were used to determine the security breach at block 108, and the detection location 306c may indicate a location within the merchant physical location 200 that the environment signals came from.

For example, a determination of a security breach based on environment signals from one or more POS devices, other computing devices, and/or peripheral devices may allow for the determination of a location of the event that resulted in those environment signals. The location of an event that resulted in the determination of a security breach based on movement may be determined based on which POS devices, other computing devices, and/or peripheral devices detected that motion, based on a changing wireless signal quality as detected by a plurality of POS devices, other computing devices, and/or peripheral devices, over time, etc. The location of an event that resulted in the determination of a security breach based on sound may be determined based on which POS devices, other computing devices, and/or peripheral devices detected that sound, the level of the sound measurement recorded by a plurality of POS devices, other computing devices, and/or peripheral devices, etc. The location of an event that resulted in the determination of a security breach based on heat measurements may be determined based on which POS devices, other computing devices, and/or peripheral devices detected that heat, the level of the heat recorded by a plurality of the POS devices, other computing devices, and/or peripheral devices, etc. While a few examples have been provided, one of skill in the art in possession of the present disclosure will recognize that a variety of techniques for determining and displaying the location of an event detected by the POS security system that caused the determination of a security breach will fall within the scope of the present disclosure.

The POS security viewing screen 312 also includes an environment signal window 314 that, in the illustrated embodiment, includes a camera view from one of the POS devices 208 in the merchant physical location 200. In an embodiment, the environment signal window 314 may display the camera view from a camera on a POS device that detected the environment signal that resulted in the determination of the security breach. A change button 316 is provided to allow a user of the management device 300 to change the camera view of the environment signal window 314 such that a camera view from a camera in a different POS device is displayed. The POS security viewing screen 312 also includes a POS device status section 318 that, in the illustrated embodiment, includes the current status of each of the POS devices. For example, the POS device status section 318 in the illustrated embodiment indicates that the POS device 208 at the rear of the merchant physical location 200 has detected motion via its connected peripheral device 210, while one of the POS devices has not detected an environment signal, two POS devices are deactivated, one POS device has detected sound via a microphone and is currently recording that sound, and another POS device has detected motion via a camera and is currently recording with that camera. Furthermore, the POS device status section 318 includes buttons to activate the deactivated POS devices, as well as buttons to stop recording of sound and using a camera. While a few examples of security breach information provided to a user on a management device have been provided, any environment signals detected and received from POS devices, as well as other security breach information captured in the security system and/or known in the art, will fall within the scope of the present disclosure and may be provided to the user (e.g., via the management device 300 of FIG. 3b) at block 112.

A contact security button 320 is also provided on the POS security viewing screen 312. In an embodiment, a system database may include contact or alert information for security providers such as, for example, a private security company, the police, and/or a variety of other security providers known in the art. Such information may be provided by the merchant, included in the system by the system provider, or searched for and linked to by the security system itself (e.g., the security system may be configured to search for appropriate security provider contact information and save that information in the database). Thus, in response to the determination of a security breach using the POS security system described herein (e.g., such that the detected motion and sound illustrated in FIG. 3b), a user may be provided with the POS security viewing screen 312 that details where the security breach was detected, allows the user to select camera views, sound, or other environment signals being recorded or transmitted from the merchant physical location 200, and to contact security if necessary.

FIG. 3c illustrates an embodiment of the management device 300 including the display 302 displaying a POS security review screen 322 that includes the security breach information provided to the user at block 112. In the illustrated embodiment, the POS security review screen 322 includes the merchant physical location graphic 306 having the plurality of POS device indicators 306a and peripheral device indicators 306b discussed above, as well as a plurality of detection locations 306d, 306e, and 306f, along with a movement tracking indication 306g. The POS security review screen 322 illustrates how the security system may determine one or more security breaches from a plurality of environment signals and record those security breaches for presentation to a user.

The POS security review screen 322 also includes an environment signal window 324 that, in the illustrated embodiment, includes images captures by cameras in POS devices, along with a next button 328 that allows a user to review other images captures by that camera or other cameras in other POS devices. The POS security review screen 322 also includes a detection log 330 and a detection legend 332 that details the detection locations 306d-f and tracking indication 306g in the merchant physical location graphic 306. Thus, as can be seen using the merchant physical location graphic 306 and detection log 330, at 1:00 a.m., motion was detected and ignored (e.g., based possibly on that detected motion resulting in an image being taken that matched an image in a detection signature), at 3:15 a.m., a sound event was detected by two POS devices (as indicated by detection location 306d on the merchant physical location graphic 306 and possibly based on a broken window), between 3:16 a.m. and 3:30 a.m., motion was detected and tracked (as indicated by the motion indication 306g on the merchant physical location graphic 206), at 3:20 a.m. a motion event was detected by one of the POS devices (e.g., as indicated by detection location 306f and possibly based on an accelerometer reading by the POS device due to movement of that POS device), and at 3:29 a.m., a sound event was detected by a POS devices (as indicated by detection location 306e on the merchant physical location graphic 306 and possibly based on a broken window or door). Furthermore, images captured by the POS devices (e.g., in response to the motion tracking) may be browsed through by the user (e.g., using the next button 328) to retrieve more information about the security breach.

Thus, systems and methods have been described that provide a POS security system that allows a merchant to repurpose a POS system to provide a security system for a merchant physical location by leveraging environment sensors included on the POS devices or enabled by the group functioning of the POS devices to detect motion, sound, heat, smoke, and/or a variety of other environment signals that may be indicative of a security breach in the merchant physical location. The security systems and methods reduce cost for a merchant by allowing that merchant to use computing devices such as POS devices, tablet computers, mobile computers, desktop computers, and peripheral devices, which are already used in the merchants business for non-security purposes, to provide a security system that operates to protect that business from break-in's and theft. Similarly, a residence may use a plurality of computing devices to provide the same benefits recognized by a merchant at a merchant physical location.

Figure 4:
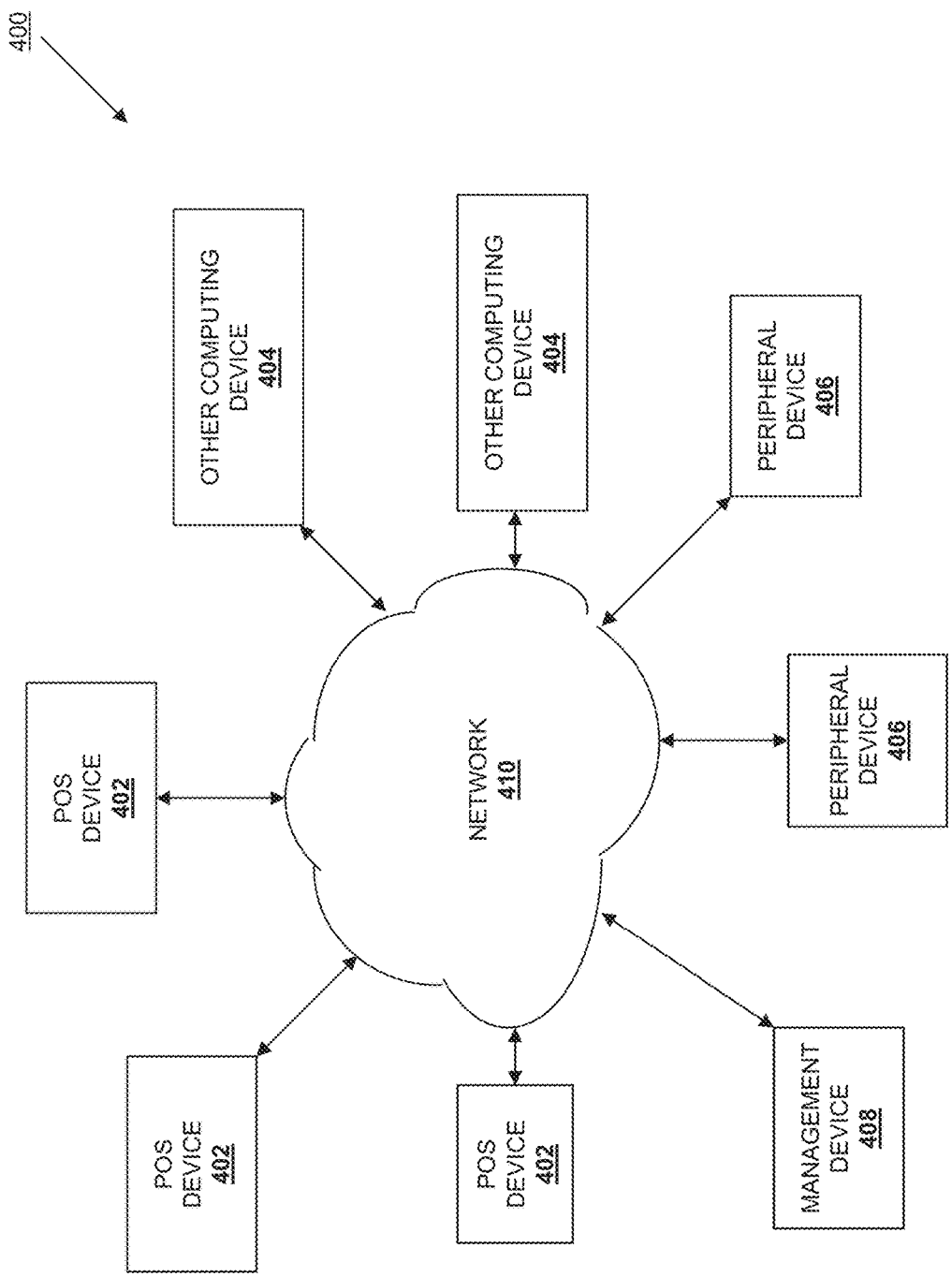
FIG. 4 is a schematic view illustrating an embodiment of a networked system.

Referring now to FIG. 4, an embodiment of a network-based system 400 for implementing one or more processes described herein is illustrated. As shown, network-based system 400 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 4 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 400 illustrated in FIG. 4 includes a plurality of POS devices 402, a plurality of other computing devices 404, a plurality of peripheral device 406, and a management device 408 in communication over a network 410. Any of the POS devices 402 may be the POS devices 208 discussed above and may be operated by the merchants or merchants employees as discussed above. The other computing devices 404 may be the other computing devices discussed above and may be operated by the merchants or merchants employees as discussed above. The peripheral devices 406 may be the peripheral devices discussed above and may be operated by the merchants or merchants employees as discussed above.

The management device 408 may be the management devices discussed above and may be operated by the merchants, merchants' employees, and/or users as discussed above.

The POS devices 402, other computing devices 404, peripheral devices 406, and management device 408 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 400, and/or accessible over the network 410.

The network 410 may be implemented as a single network or a combination of multiple networks. For example, in various embodiments, the network 410 may include the Internet and/or one or more intranets, landline networks, wireless networks, and/or other appropriate types of networks.

The POS devices 402, other computing devices 404, peripheral devices 406, and management device 408 may be implemented using any appropriate combination of hardware and/or software configured for wired and/or wireless communication over network 410. For example, in one embodiment, the POS devices 402, other computing devices 404, peripheral devices 406, and/or management device 408 may be implemented as a personal computer of a user in communication with the Internet. In other embodiments, the POS devices 402, other computing devices 404, peripheral devices 406, and/or management device 408 may be a smart phone, personal digital assistant (PDA), laptop computer, tablet computer, and/or other types of computing devices.

The POS devices 402, other computing devices 404, peripheral devices 406, and/or management device 408 may include one or more browser applications which may be used, for example, to provide a convenient interface to permit customer or merchant to browse information available over the network 410. For example, in one embodiment, the browser application may be implemented as a web browser configured to view information available over the Internet.

The POS devices 402, other computing devices 404, peripheral devices 406, and/or management device 408 may also include one or more toolbar applications which may be used, for example, to provide user-side processing for performing desired tasks in response to operations selected by the customer or merchant. In one embodiment, the toolbar application may display a user interface in connection with the browser application.

The POS devices 402, other computing devices 404, peripheral devices 406, and/or management device 408 may further include other applications as may be desired in particular embodiments to provide desired features to the POS devices 402, other computing devices 404, peripheral devices 406, and/or management device 408. In particular, the other applications may include a payment application for payments assisted by a payment service provider through a payment service provider device. The other applications may also include security applications for implementing user-side security features, programmatic user applications for interfacing with appropriate application programming interfaces (APIs) over the network 410, or other types of applications. Email and/or text applications may also be included, which allow a user to send and receive emails and/or text messages through the network 410. The POS devices 402, other computing devices 404, peripheral devices 406, and/or management device 408 may include one or more user and/or device identifiers which may be implemented, for example, as operating system registry entries, cookies associated with the browser application, identifiers associated with hardware of the device, or other appropriate identifiers, such as a phone number. In one embodiment, the user identifier may be used to associate the user with a particular account or user profile.

The POS devices 402, other computing devices 404, peripheral devices 406, and/or management device 408 may be maintained, for example, by a conventional or on-line merchant, conventional or digital goods seller, individual seller, and/or application developer offering various products and/or services in exchange for payment to be received conventionally or over the network 410. In this regard, the POS devices 402, other computing devices 404, peripheral devices 406, and/or management device 408 may include or be coupled to a database identifying available products and/or services (e.g., collectively referred to as items) which may be made available for viewing and purchase by a customer.

The POS devices 402 may also include a checkout application which may be configured to facilitate the purchase by the payer of items. The checkout application may be configured to accept payment information from a customer through the POS device 402 over the network 410.

Figure 5:
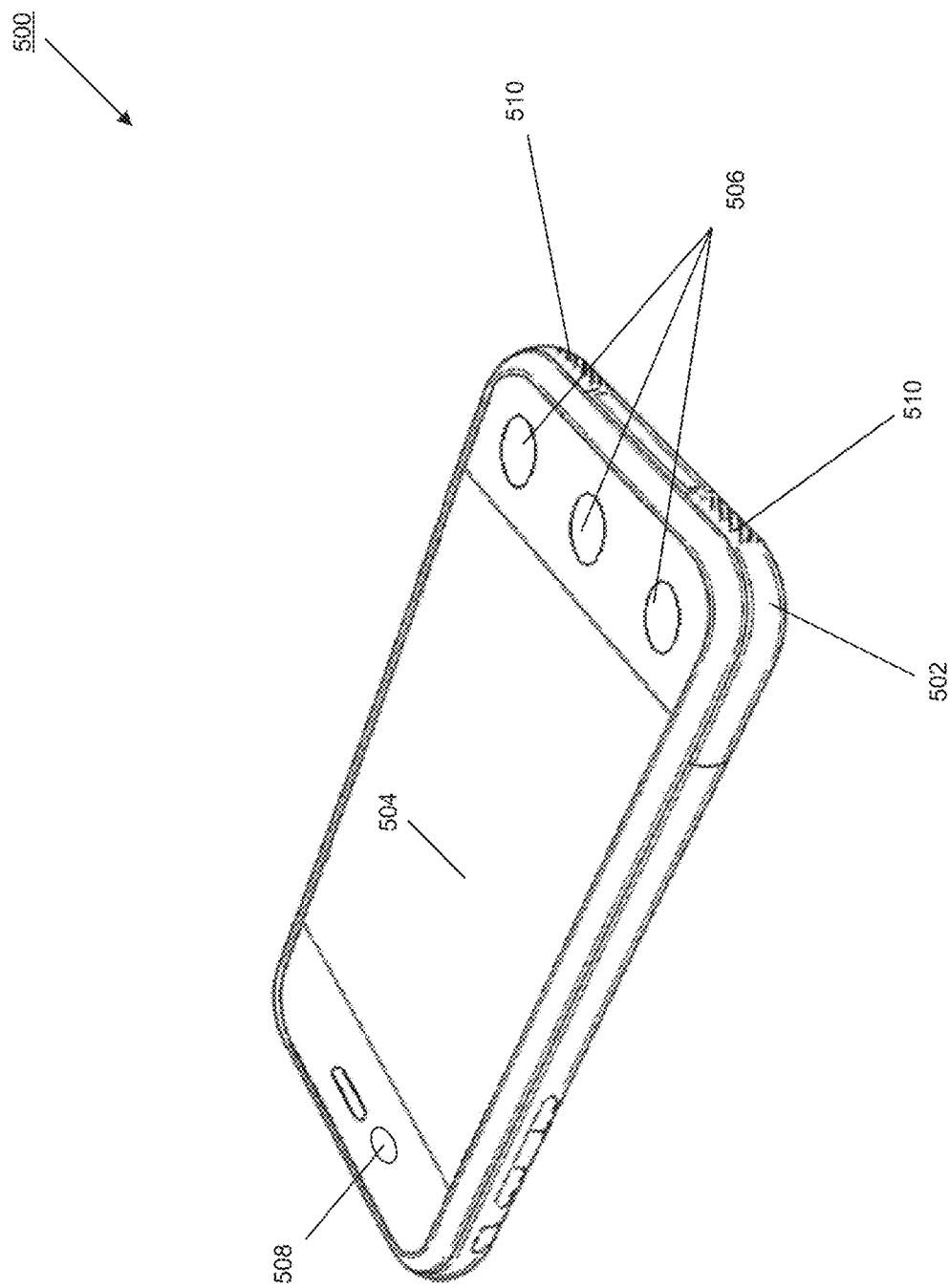
FIG. 5 is a perspective view illustrating an embodiment of a POS or other computing device.

Referring now to FIG. 5, an embodiment of a POS device and/or other computing device 500 is illustrated. The device 500 may be the POS devices 208 and 402, or the other computing devices 404, discussed above. The device 500 includes a chassis 502 having a display 504 and an input device including the display 504 and a plurality of input buttons 506. One of skill in the art will recognize that the device 500 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure. The device 500 may include a payment card reader such as, for example, the PayPal Here™ payment card reader available from PayPal Inc. of San Jose, Calif. Furthermore, the device 500 may include cameras (such as the camera 508 illustrated on the front side of the chassis 502) on either side of the chassis 502, microphones 510, accelerometers (not illustrated), network communication devices (not illustrated), and/or a variety of other environment sensors known in the art.

Figure 6:
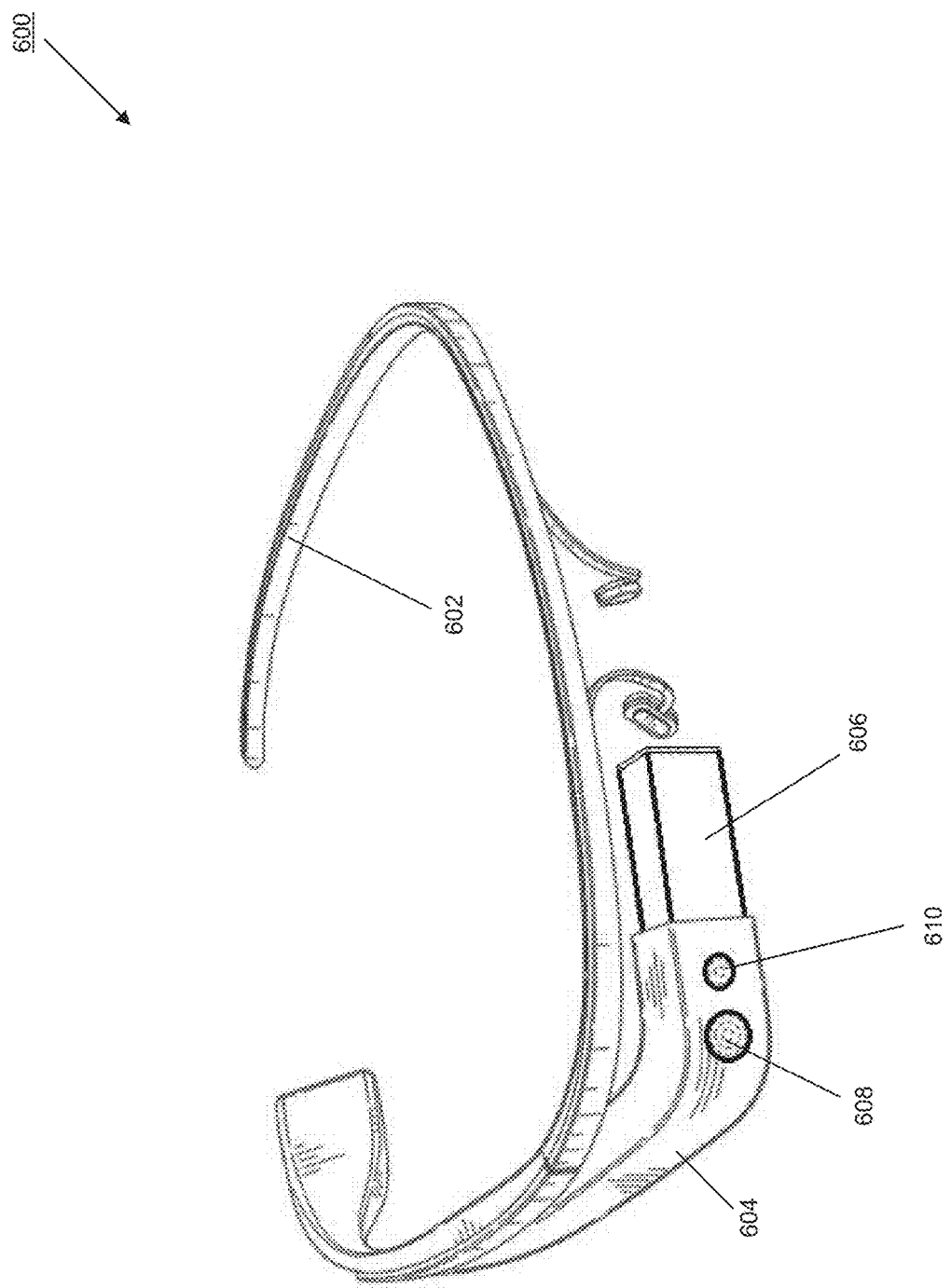
FIG. 6 is a perspective view illustrating an embodiment of a POS or other computing device.

Referring now to FIG. 6, an embodiment of a POS device and/or other computing device 600 is illustrated. The device 600 may be the POS devices 208 and 402, or the other computing devices 404, discussed above. The device 600 includes a frame 602 having a computing chassis 604 that extends from the frame, a display 606 that extends from the computing chassis 604, a microphone 608 located on the computing chassis 604, and a camera located on the computing chassis 604. One of skill in the art will recognize that the device 600 is a mobile wearable customer engagement device such as, for example, Google Glass® available from Google Inc. of Mountain View, Calif. that allows a merchant to interact with a customer to provide the functionality discussed above with reference to the method 100. However, a variety of other mobile wearable customer engagement devices may be used in the method 100 without departing from the scope of the present disclosure.

Figure 7:
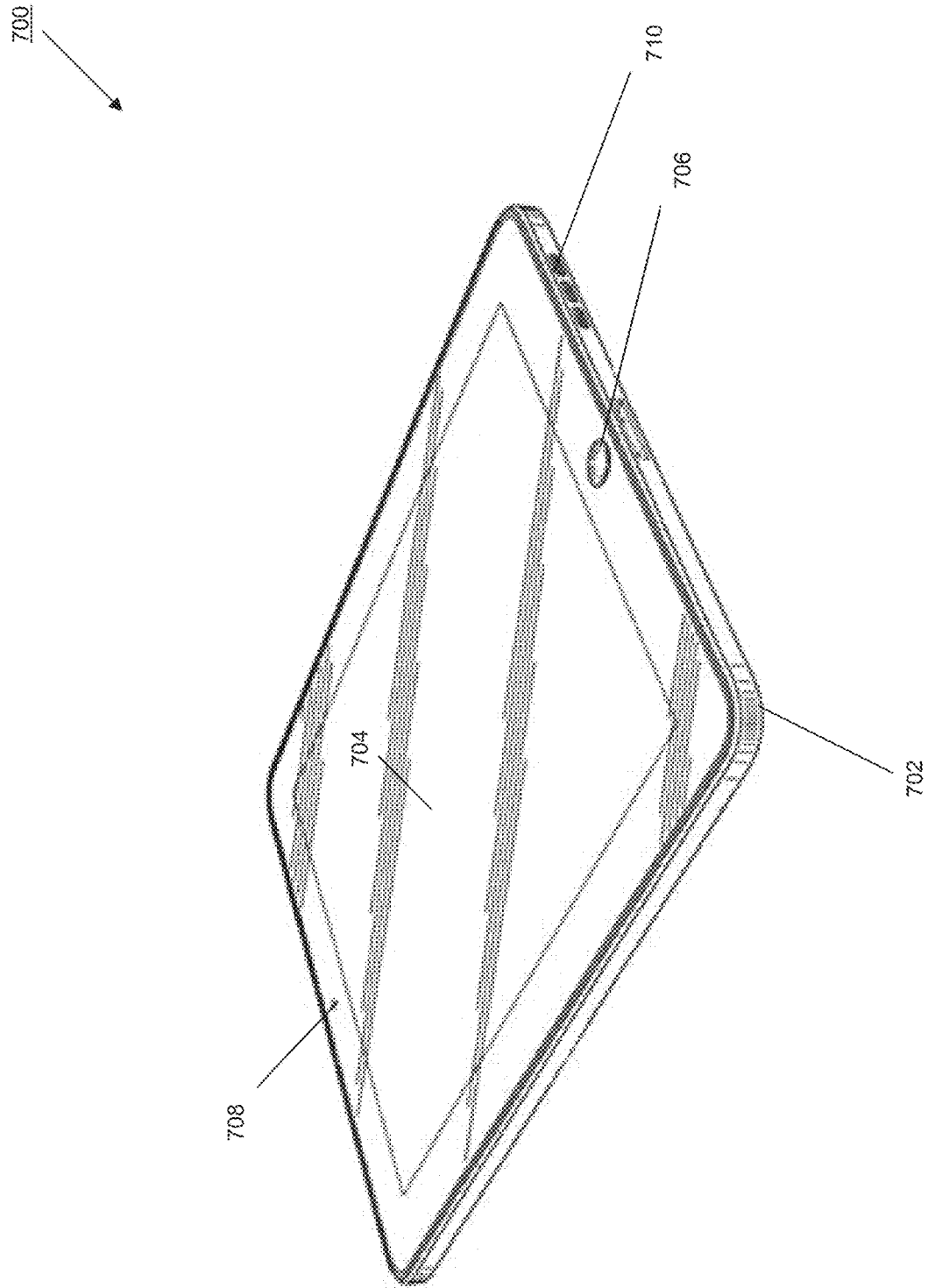
FIG. 7 is a perspective view illustrating an embodiment of a POS or other computing device.

Referring now to FIG. 7, an embodiment of a POS device and/or other computing device 700 is illustrated. The device 700 may be the POS devices 208 and 402, or the other computing devices 404, discussed above. The device 700 includes a chassis 702 having a display 704 and an input device including the display 704 and an input button 706. One of skill in the art will recognize that the device 700 is a tablet computer including a touch screen input device and an button that allow the functionality discussed above with reference to the method 100. However, a variety of other tablet devices may be used in the method 100 without departing from the scope of the present disclosure. The device 700 may include a payment card reader such as, for example, the PayPal Here' payment card reader available from PayPal Inc. of San Jose, Calif. Furthermore, the device 700 may include cameras (such as the camera 708 illustrated on the front side of the chassis 702) on either side of the chassis 702, microphones 710, accelerometers (not illustrated), network communication devices (not illustrated), and/or a variety of other environment sensors known in the art.

With regard to each of the examples of POS devices and/or other computing devices 500, 600, and 700, as is known in the art each of those devices may include docking or charging stations that allow a battery in the device to be charged such that the device can be used in a mobile manner. In the POS security systems or other security systems discussed herein, those docking or charging stations may be places around the merchant physical location or other physical location in a manner to optimize the function of the devices as security devices when not in use for their primary purpose (e.g., as POS devices, user devices, etc.). For example, docking or charging stations may be placed in specific rooms or areas where security is desired, oriented towards physical location points of interest (e.g., the entrance 204 of the merchant physical location 200, expensive products located in the merchant physical location, a safe, etc.) such that a camera on the device is directed towards that point of interest when docked, etc. Thus, when the devices are not in use for their primary purpose during merchant business/operating hours, those devices may be docked or otherwise coupled to their docking/charging stations and used as the security system described herein to detect security breaches to the merchant physical location.

Figure 8:
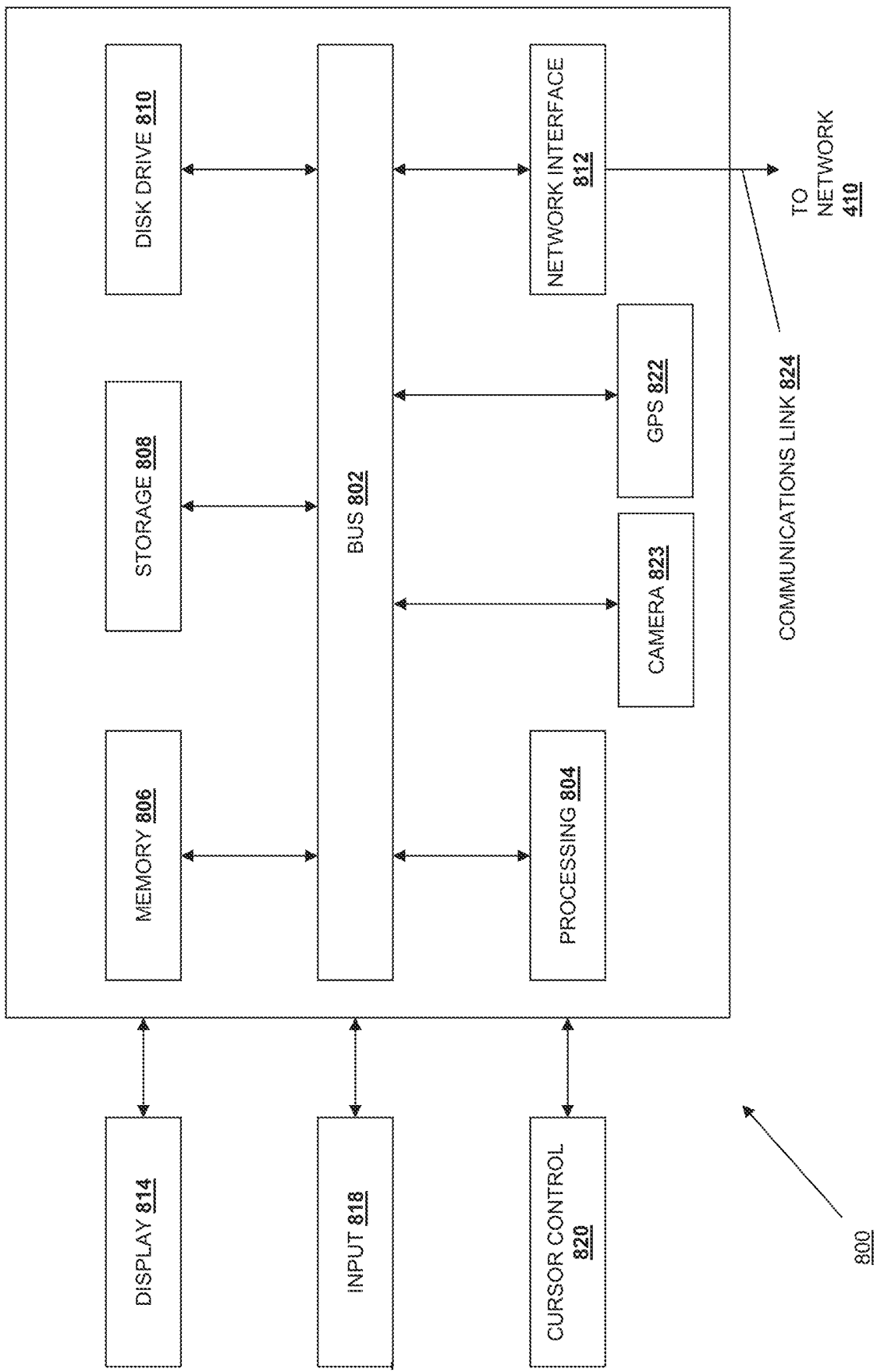
FIG. 8 is a schematic view illustrating an embodiment of a computer system.

Referring now to FIG. 8, an embodiment of a computer system 800 suitable for implementing, for example, the POS devices 402, 500, 600, or 700, other computing devices 404, 500, 600, or 700, peripheral devices 406, and/or management device 408, is illustrated. It should be appreciated that other devices utilized by customers, merchants, or other users in the POS security system discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), a location determination component 822 (e.g., a Global Positioning System (GPS) device as illustrated, a cell tower triangulation device, and/or a variety of other location determination devices known in the art), and/or a camera 823. In one implementation, the disk drive component 810 may comprise a database having one or more disk drive components.

In accordance with embodiments of the present disclosure, the computer system 800 performs specific operations by the processor 804 executing one or more sequences of instructions contained in the memory component 806, such as described herein with respect to the POS devices 402, 500, 600, or 700, other computing devices 404, 500, 600, or 700, peripheral devices 406, and/or management device 408. Such instructions may be read into the system memory component 806 from another computer readable medium, such as the static storage component 808 or the disk drive component 810. In other embodiments, hard-wired circuitry may be used in place of or in combination with software instructions to implement the present disclosure.

Logic may be encoded in a computer readable medium, which may refer to any medium that participates in providing instructions to the processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the network 410 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Figure 9:
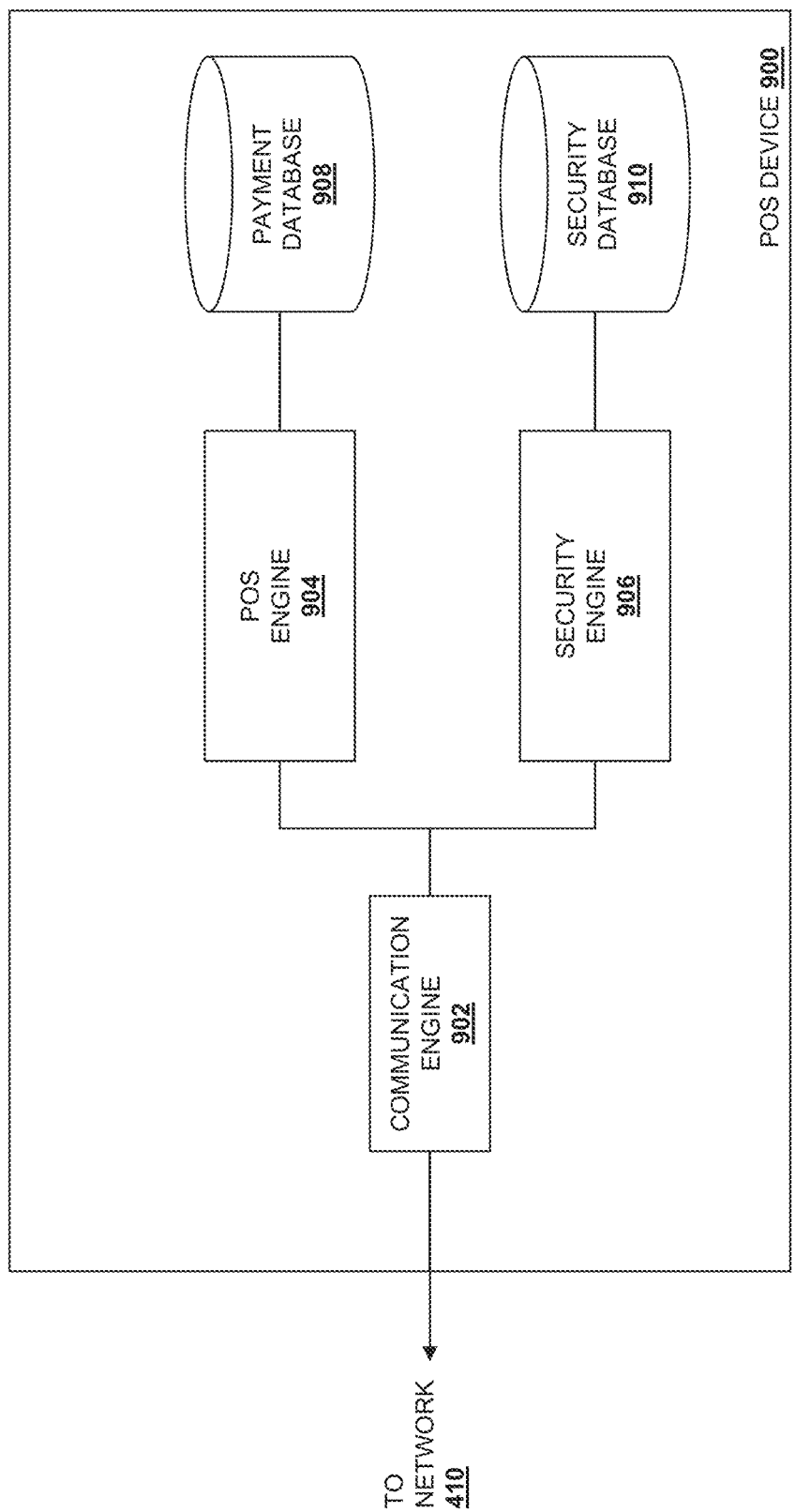
FIG. 9 is a schematic view illustrating an embodiment of a POS and/or management device.

Referring now to FIG. 9, an embodiment of a POS device 900 is illustrated. In an embodiment, the device 900 may be the POS devices 402, 500, 600, or 700. The device 900 includes a communication engine 902 that is coupled to the network 410 and to each of a POS engine 904 and a security engine 906. The POS engine 904 is coupled to a payment database 908, and the security engine 906 is coupled to a security database 910. The communication engine 902 may be software or instructions stored on a computer-readable medium that allows the device 900 to send and receive information over the network 410. The POS engine 904 may be software or instructions stored on a computer-readable medium that is operable to receive and transmit payment information for conducting a payment transaction associated with the purchase between a customer and a payment service provider or account provider, and provide any of the other functionality that is discussed above. The security engine 906 may be software or instructions stored on a computer-readable medium that is operable to detect environment signals, analyze the environment signals to determine a security breach, compare environment signals to detection signatures, provide security breach information to a user, and provide any of the other functionality that is discussed above.

The payment database 908 may include any payment information needed by the POS engine 904 for conducting payment transactions, including customer account information merchant account information, financial account information, product information, and/or a variety of other payment transaction information known in the art. The security database 910 may include any security information needed by the security engine 906 for providing the security system including environment signal thresholds, detection signatures, logged security information, and/or a variety of other security information known the art. While the databases 908 and 910 has been illustrated as located in the device 900, one of skill in the art will recognize that it may be connected to the POS engine 904 and security engine 906 through the network 410 without departing from the scope of the present disclosure. Furthermore, as discussed above, a management device may include the security engine 906 and security database 910 for operating with the POS devices.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on customer and merchants; however, a customer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed:

1. A method for providing security to point of sale (POS) devices, comprising:
   receiving first environment signals from a first environment sensor of a first POS device and second environment signals from second environment sensor of a second POS device, the first environment signals and the second environment signals indicative of a wireless signal quality of a wireless environment at one or more of the first POS device and the second POS device;
   analyzing the first environment signals and the second environment signals to determine a wireless signal quality change in the wireless environment that is indicative of a security breach;
   providing a security breach result of the analyzing via a user interface;
   determining whether to transition at least one of the first POS device or the second POS device from executing purchase instructions for conducting purchase transactions within a first time period to executing security instructions within a second time period; and
   determining whether to transition a customer engagement device from executing customer purchase instructions for conducting customer purchase transactions within a third time period to executing customer security instructions within a fourth time period.

2. The method of claim 1, further comprising:
   receiving third environment signals received from a peripheral device environment sensor to the first POS device, wherein the first POS device analyzes the third environment signals to determine the security breach.

3. The method of claim 1, further comprising:
   analyzing signal quality of the first environment signals and the second environment signals in accordance with a sensitivity setting to determine that the wireless signal quality change in the wireless signal quality of the wireless environment is indicative of the security breach.

4. The method of claim 1, further comprising:
   transmitting a communication to a management device to cause the management device to display, in the user interface, a location, in the wireless environment, of the wireless signal quality change.

5. The method of claim 1, further comprising:
   receiving audio information provided by the first environment sensor on the first POS device in response to audio generated by the second POS device; and
   analyzing the audio information to detect motion that is indicative of the security breach.

6. The method of claim 1, wherein the determining whether to transition at least one of the first POS device or the second POS device is based on one or more of a location of each of the first POS device and the second POS device and respective types of the first environmental sensors and the second environmental sensors.

7. The method of claim 1, wherein the first POS device is configured to execute a portion of the security instructions in background while executing the purchase instructions.

8. The method of claim 1, wherein the first POS device is configured to transition to executing the security instructions when docked with a docking station that provides power to the first POS device.

9. The method of claim 1, further comprising:
receiving from at least one of the first POS device, the second POS device, or the customer engagement device, additional data sensed by the at least one of the first POS device, the second POS device, or the customer engagement device during a payment transaction; and
processing the additional data during the payment transaction.

10. A device, comprising:
a non-transitory memory storing instructions; and
a processor configured to execute the instructions to cause the device to:
receive first environment signals from a first environment sensor of a first POS device and second environment signals from a second environment sensor of a second POS device, the first environment signals and the second environment signals indicative of a wireless signal quality of a wireless environment at one or more of the first POS device and the second POS device;
analyze the first environment signals and the second environment signals to determine a wireless signal quality change in the wireless environment that is indicative of a security breach;
provide a result of analyzing the first environment signals and the second environment signals via a user interface;
determine whether to transition at least one of the first POS device or the second POS device from executing purchase instructions for conducting purchase transactions within a first time period to executing security instructions within a second time period; and
determine whether to transition a customer engagement device from executing customer purchase instructions for conducting customer purchase transactions within a third time period to executing customer security instructions within a fourth time period.

11. The device of claim 10, wherein executing the instructions further causes the device to,
analyze signal quality of the first environment signals and the second environment signals in accordance with a sensitivity setting to determine that the wireless signal quality change in the wireless signal quality of the wireless environment is indicative of the security breach.

12. The device of claim 10, wherein executing the instructions further causes the device to,
receive audio information provided by the first environment sensor on the first POS device in response to audio generated by the second POS device; and
analyze the audio information to detect motion that is indicative of the security breach.

13. The device of claim 10, wherein the determining whether to transition at least one of the first POS device or the second POS device is based on one or more of a location of each of the first POS device and the second POS device and respective types of the first environmental sensor and the second environmental sensor.

14. The device of claim 10, wherein the first POS device is configured to execute a portion of the security instructions in background while executing the purchase instructions.

15. The device of claim 10, wherein executing the instructions further causes the device to,
receive from at least one of the first POS device, the second POS device, or the customer engagement device, additional data sensed by the at least one of the first POS device, the second POS device, or the customer engagement device during a payment transaction; and
processing the additional data during the payment transaction.

16. A non-transitory machine-readable medium having instructions stored thereon, the instructions executable to cause performance of operations comprising:
receiving first environment signals from a first environment sensor of a first POS device and second environment signals from a second environment sensor of a second POS device, the first environment signals and the second environment signals indicative of a wireless signal quality of a wireless environment at one or more of the first POS device and the second POS device;
analyzing the first environment signals and the second environment signals to determine a wireless signal quality change in the wireless environment that is indicative of a security breach;
providing an indication of the security breach via a user interface based on the analyzing;
after providing the indication via the user interface, determining whether to transition at least one of the first POS device or the second POS device from executing purchase instructions for conducting purchase transactions within a first time period to executing security instructions within a second time period; and
determining whether to transition a customer engagement device from executing customer purchase instructions for conducting customer purchase transactions within a third time period to executing customer security instructions within a fourth time period.

17. The non-transitory machine-readable medium of claim 16, wherein the operations further comprise:
receiving audio information provided by the first environment sensor on the first POS device in response to audio generated by the second POS device; and
analyzing the audio information to detect motion that is indicative of the security breach.

18. The non-transitory machine-readable medium of claim 16, wherein the determining whether to transition at least one of the first POS device or the second POS device is based on one or more of a location of each of the first POS device and the second POS device and respective types of the first environmental sensor and the second environmental sensor.

19. The non-transitory machine-readable medium of claim 16, wherein the first POS device is configured to execute a portion of the security instructions in background while executing the purchase instructions.

20. The non-transitory machine-readable medium of claim 16, wherein the operations further comprise:
receiving from at least one of the first POS device, the second POS device, or the customer engagement device, additional data sensed by the at least one of the first POS device, the second POS device, or the customer engagement device during a payment transaction; and processing the additional data during the payment transaction.

\* \* \* \* \*